United States Patent [19]
Nagengast et al.

[11] Patent Number: 5,151,849
[45] Date of Patent: Sep. 29, 1992

[54] HEADLAMP LEVELING ARRANGEMENT

[75] Inventors: William E. Nagengast, Anderson; Philip C. Filosa, Indianapolis, both of Ind.

[73] Assignee: General Motors Corporation, Detroit, Mich.

[21] Appl. No.: 740,743

[22] Filed: Aug. 6, 1991

[51] Int. Cl.⁵ .............................................. F21M 3/18
[52] U.S. Cl. ........................................ 362/61; 362/66; 362/287; 362/427; 33/335; 33/379
[58] Field of Search ............... 362/61, 66, 80, 287, 362/418, 427, 428; 33/335, 365, 370, 379

[56] References Cited

U.S. PATENT DOCUMENTS

| | | | |
|---|---|---|---|
| 2,058,743 | 10/1936 | Trippe | 362/311 |
| 4,660,128 | 4/1987 | Beroin et al. | 362/80 |
| 4,802,067 | 1/1989 | Ryder | 362/61 |
| 5,029,051 | 7/1991 | Shirai et al. | 362/66 |
| 5,032,964 | 7/1991 | Endo et al. | 362/66 |

Primary Examiner—Richard R. Cole
Attorney, Agent, or Firm—Edward J. Biskup

[57] ABSTRACT

A leveling arrangement for a vehicle headlamp that includes a slot formed in the upper portion of the reflector member in which a spirit level member is located and combined with a spring clip which is fastened to the reflector member and to one end of the spirit level member and includes a leaf spring which continuously biases the other end of the spirit level member in one direction so that an adjustment screw threadably received by the spirit level member permits the aforementioned other end of the spirit level member to be raised or lowered for providing calibration of the spirit level member relative to the optical axis of the reflector member.

3 Claims, 2 Drawing Sheets

HEADLAMP LEVELING ARRANGEMENT

This invention concerns headlamps and more particularly a vehicle headlamp provided with an adjustable spirit level which allows the headlamp to be pre-aimed and afterwards installed in a vehicle for proper projection of the headlamp beam without requiring any special aiming equipment to be attached to the headlamp.

In the preferred form, the present invention concerns a leveling arrangement for a vehicle headlamp having a reflector housing provided with a reflector cavity for projecting a light beam substantially parallel to the optical axis of the reflector cavity. A retainer slot is formed in the upper portion of the reflector housing and is defined by a bottom wall, a top wall and a pair of side walls. A support member, provided with a pair of outwardly extending legs, is located in the retainer slot and serves to support a spirit level. The support member is mounted in the retainer slot by a spring clip one end of which is fastened to the housing and to the support member. A portion of of the spring clip is located in the slot between the top wall and the legs of the support member for continuously biasing the other end of the support member towards the bottom wall. In addition, screw means are threadably received by the support member at the other end thereof and adapted to engage the bottom wall whereby rotation of the screw means causes pivoted adjustment of the position of the spirit level about the aforementioned one end of the support member to thereby allow the spirit level to be calibrated relative to the optical axis of the the reflector cavity.

The objects of the present invention are to provide a new and improved leveling arrangement for a vehicle headlamp wherein the reflector housing has a spirit level mounted thereon and is combined with a spring clip and screw means which cooperate to provide calibration of the spirit level relative to the optical axis of the headlamp; to provide a new and improved leveling arrangement for a vehicle headlamp that includes a slot formed in the upper portion of the reflector member in which a spirit level member is located and combined with a spring clip which is fastened to the reflector member and to one end of the spirit level member and includes a leaf spring which continuously biases the other end of the spirit level member in one direction so that an adjustment screw threadably received by the spirit level member permits the aforementioned other end of the spirit level member to be raised or lowered for providing calibration of the spirit level member relative to the optical axis of the reflector member; and to provide a new and improved leveling arrangement for a vehicle headlamp which includes a spring clip having a body portion adapted to be fastened to the reflector member and having a pair of leaf spring members extending from the body portion for location within a retainer slot for a spirit level member provided with an adjustment screw so that upon rotation of the adjustment screw, the spirit level member can be calibrated relative to the optical axis of the reflector member.

One patent that discloses an adjustable level for a headlamp that has certain similarities to the present invention but differs therefrom in the manner the spirit level is mounted and supported for adjustable movement in U.S. Pat. No. 4,802,067, entitled "Headlight Aiming and Leveling Device", in the name of Ryder et al and issued on Jan. 31, 1989.

Other objectives and advantages of the present invention will be apparent from the following detailed description when taken with the drawings in which.

Figure 1:
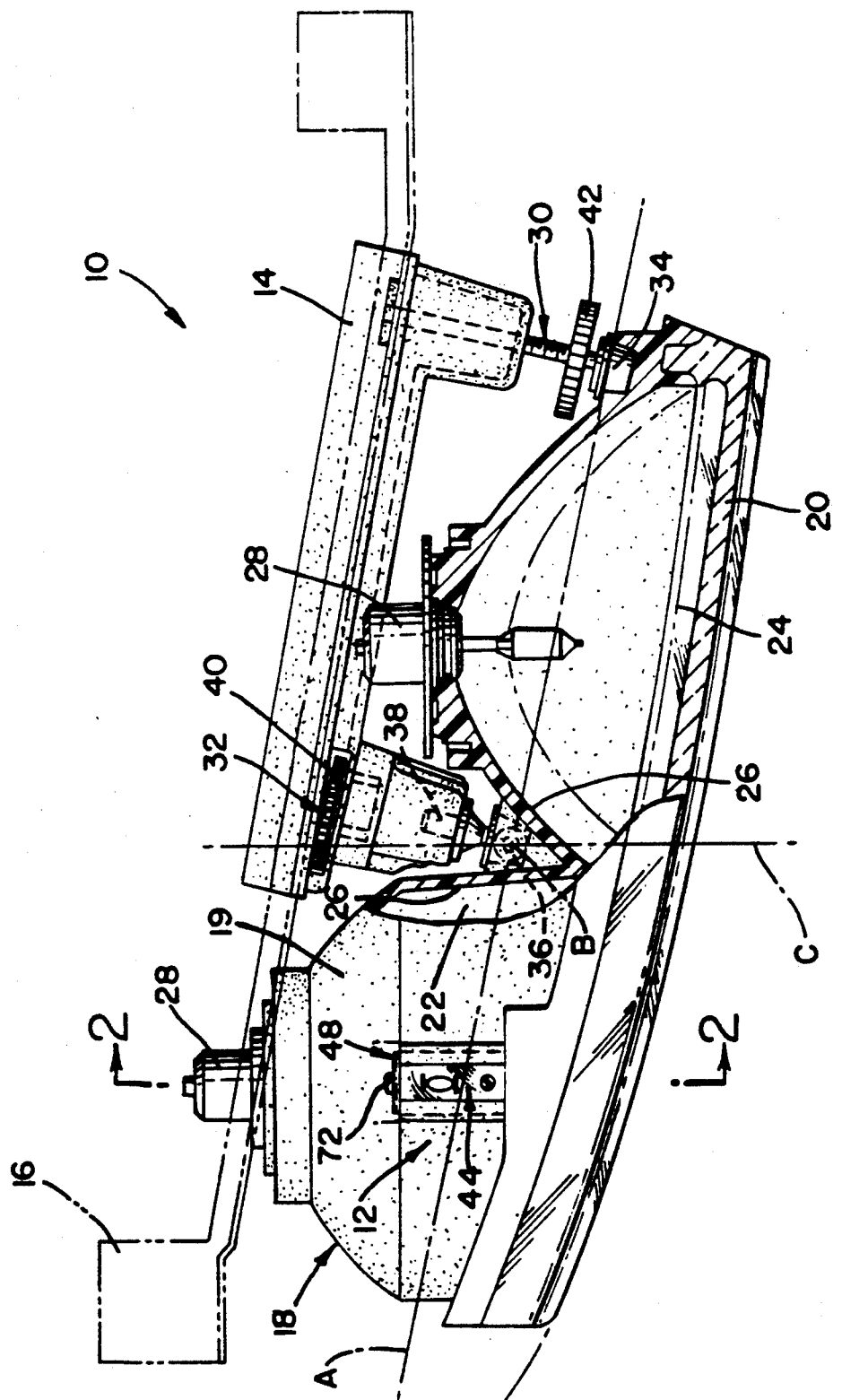
FIG. 1 is a plan view of a headlamp assembly incorporating a leveling arrangement made in accordance with the present invention.

Referring to the drawings and more particularly FIG. 1 thereof, a headlamp assembly 10 is shown of the replaceable light bulb composite type incorporating a leveling arrangement 12 made in accordance with the present invention. The headlamp assembly 10 includes a mounting bracket 14 secured to the sheet metal 16 of the front end of a motor vehicle that carries a headlamp body 18 for selective adjustable movement in a horizontal plane containing a horizontal aim axis A and in a vertical plane containing a substantially vertical aim axis B. The headlamp body 18 includes a plastic reflector member 19 enclosed by a glass or plastic clear lens 20 and formed with a pair of side-by-side parabolic cavities 22 and 24 the concave surface 26 of each of which is aluminized so as to project a light beam emanating from a light bulb 28 and substantially parallel to an axis C. It will be noted that as shown in FIG. 1, the axis C is parallel to the longitudinal center axis of the associated motor vehicle and the headlamp assembly 10 would be the left hand unit when looking towards the front of the vehicle. As should be apparent, the angled position of the headlamp assembly is due to the rounded streamline front end design which is currently popular with motor vehicles. Also, each light bulb 28 in the respective cavities 22 and 24 is provided with a single filament located so as to cause the associated parabolic reflective surface to project a light beam forwardly of the vehicle. The light bulb 28 in the cavity 24 allows the associated reflective surface to project a so-called "low beam" when energized while the light bulb (not shown) in the cavity 22 will project the so-called "high beam" when energized. Thus, the headlamp body 18 is actually two separate headlamps, a low beam unit and a high beam unit, joined together so as to facilitate aiming adjustment of both beams.

The mounting bracket 14 is identical in construction to the mounting bracket seen in U.S. Pat. No. 4,916,586 in the name of Van Duyn et al, entitled "Mounting Bracket for Headlamp Assembly" issued on Apr. 10, 1990 and assigned to the assignee of this invention. Accordingly, reference is made to the '586 patent for a detailed description of how the mounting bracket 14 supports the headlamp body 18 for selective adjustment about the horizontal aim axis A and the vertical aim axis B. However, for present purposes it will suffice to mention that the mounting bracket 14 includes a pair of laterally spaced adjustment mechanisms 30 and 32 each of which is connected to the headlamp body 18 through a ball pivot (such as ball pivot 34 associated with mechanism 30) and also includes a stationary ball pivot 36 integral with a stud 38 press fitted in the upper portion of the bracket 14. In addition, proper aim of the headlamp body 18 can be realized by rotating a thumb wheel member 40 associated with adjustment mechanism 32 to position the headlamp body 18 about the horizontal aim axis A and by rotating a thumb wheel 42 to position the headlamp body 18 about the vertical aim axis B.

Figure 2:
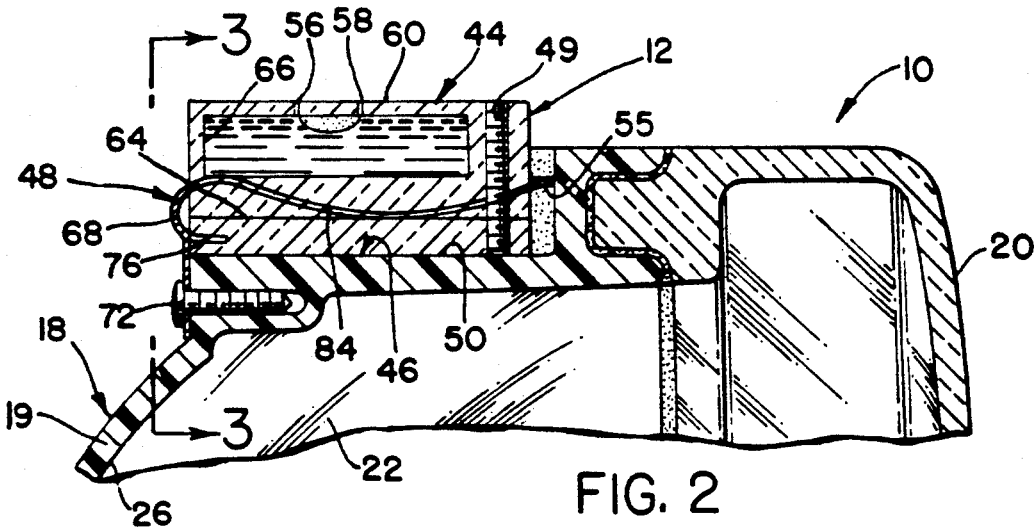
FIG. 2 is an enlarged sectional view of the leveling arrangement taken on line 2—2 of FIG. 1.
Figure 3:
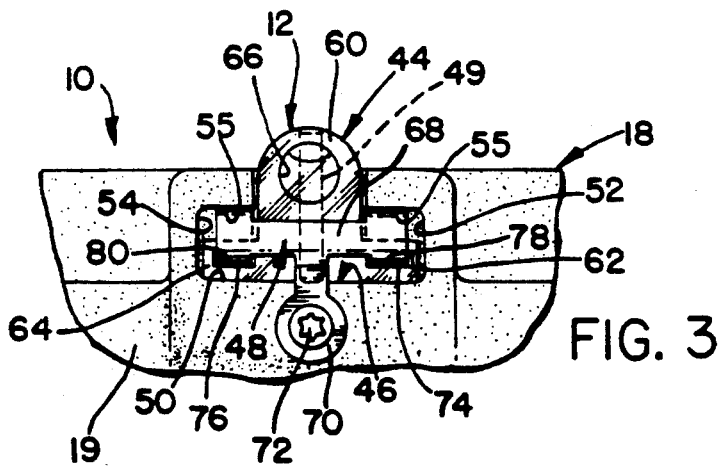
FIG. 3 is an end view of the leveling arrangement taken on line 3—3 of FIG. 2.
Figure 4:
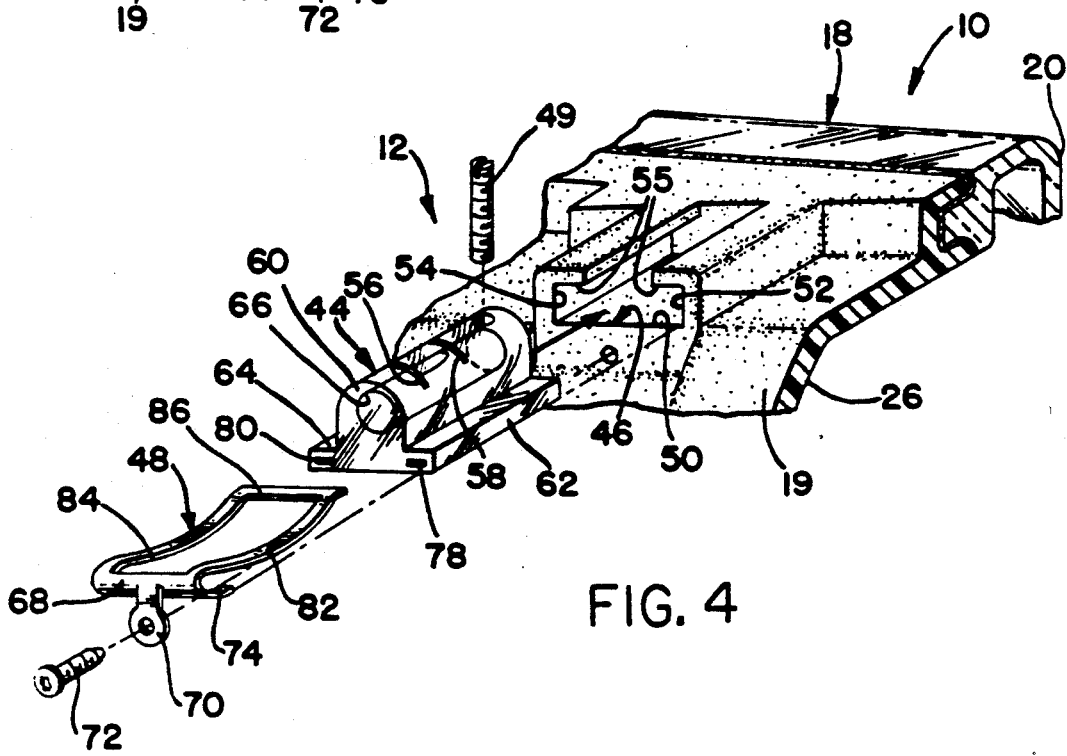
FIG. 4 is an exploded isometric view of the various parts of the leveling arrangement prior to assembly thereof.

As seen in FIGS. 2–4, the leveling arrangement 12 incorporated with the headlamp body 18 includes a spirit level member 44 that is mounted within a retainer slot 46 formed in the upper portion of the reflector member 19 to the rear of the lens 20. A spring clip 48 maintains the spirit level member 44 within the retainer slot 46 and also cooperates with an adjustment screw 49 threadably carried by the spirit level member 44 for allowing the position of the spirit level to be varied as will be more fully described hereinafter.

More specifically, the retainer slot 46 is defined by a bottom wall 50, a pair of laterally spaced side walls 52 and 54 each of which connects with a top wall 55 located in a common plane parallel to the plane of the bottom wall 50. It will be noted that the bottom wall 50 of the retainer slot 46 is intended to be located in a substantially horizontal plane when the two reflective cavities 22 and 24 of the headlamp body 18 project a properly aimed high beam and low beam. However, to compensate for the possibility that the bottom wall 50 may not always be properly located relative to the optical axis of each of the parabolic cavities as a result of coatings on the reflector member 19 or variations in the spirit level member 44, the spirit level member 44 is combined with the spring clip 48 within the retainer slot 44 and allowed to have one end thereof adjusted within prescribed limits to assure that when the bubble in the spirit level member 44 is located between the two markings 56 and 58, the proper relationship between the spirit level and the headlamp beams is attained.

As seen in FIGS. 2–4, the spirit level member 44 includes a clear plastic body portion formed as a semi-cylindrical portion 60 the lower end of which has a pair of integral and outwardly extending legs 62 and 64. The semi-cylindrical portion 60 has a cylindrical chamber 66 formed therein filled with a viscous fluid entrapping a gas bubble which moves within the confines of the chamber 66. As is conventional with spirit levels, that chamber has a slight internal arc providing a high point midway in the chamber as indicated by the markings 56 and 58. Thus, when the gas bubble is between the line markings 56 and 58 and the spirit level member is located in the retainer slot 46 as seen in FIGS. 1–3, the headlamp body 18 is in the desired aimed position about the horizontal aim axis B.

As seen in FIGS. 2–4, the spring clip 48 includes a generally "T" shaped section comprising a cross arm 68 integrally formed with a depending leg 70 having a circular opening formed therein for receiving a screw 72 that serves to fasten the spring clip 48 to the reflector member 19. The cross arm 68 is integrally formed with a pair of laterally spaced reversely bent tabs 74 and 76 located at the lower portion of the "T" shaped section. As best seen in FIGS. 2 and 3, the tabs 74 and 76 are adapted to be respectively received within a pair of slot type wells 78 and 80 formed in the one end of the legs 62 and 64 of the spirit level member. The upper portion of the "T" shaped section is integrally formed with a pair of identical and parallel leaf spring members 82 and 84 which are located directly above the tabs 74 and 76, respectively, and are normally positioned in contact with the upper surfaces of the legs 62 and 64 of the spirit level member 44 between the top walls 55 of the retainer slot 46 and the legs 62 and 64. The screw 49 is threadably received by the semi-cylindrical portion 60 of the spirit level member adjacent the end opposite the end having the slots 78 and 80 and extends therethrough along an axis which is perpendicular to the longitudinal axis of the spirit level member. Finally, a cross member 86 is integral with and joins the ends of the leaf spring members 82 and 84 and is normally located just aft of the screw 49 as seen in FIG. 2.

During assembly of the leveling arrangement 12 described above, the rectangular opening in the spring clip 48 (as defined by the cross arm 68, the pair of leaf spring members 82 and 84, and the cross member 86) receives the semi-cylindrical portion 60 of the spirit level member 44 with the bowed midpoint of each leaf spring member 82 and 84 engaging the top surface of the associated leg 62 and 64 of the spirit level member 44 and, at the same time, the tabs 74 and 76 are pressed into the slot type wells 78 and 80 of the legs 62 and 64. The combined spirit level member 44 and the spring clip 48 are then slid into the retainer slot 46 in the direction of the arrow seen in FIG. 4 resulting in the upper parts of the cross arm 68 and the cross member 86 engaging the top walls 55 of the retainer slot 46 as seen in FIG. 2. When so located within the retainer slot 46, the spirit level member 44 experiences a downward biasing force provided by the spring clip 48 that causes the base of the spirit level member 44 to make firm engagement with the bottom wall 50 of the retainer slot 46. The screw 72 is then passed through the opening in the leg 70 of the spring clip 48 to secure one end of the spring clip 48 to the reflector member 19.

With the leveling arrangement 12 assembled as described above, when the screw 49 is threaded downwardly within its accommodating bore, it will contact the bottom wall 50 of the retainer slot 46 and continued rotation of the screw 49 will cause the associated end of the spirit level member 44 to pivot upwardly about the tabs 74 and 76 and provide a limited amount of adjustment of the spirit level member 44. The amount of adjustment will be determined by the amount of clearance existing between the top surfaces of the legs 62 and 64 and the top walls 55 of the retainer slot 46.

From the above description, it should be apparent that a leveling arrangement has been provided which allows the lamp body 18 to be located in a pre-set fixture which, after the one or the other light bulb 28 is energized, establishes the desired aimed position for the headlamp body 18. When such aimed position is realized, if the bubble of the spirit level member 44 is not located at the midpoint of the chamber between the markings 56 and 58, a final tuning of the spirit level be attained by use of the adjustment screw 49 as explained above.

Various changes and modifications can be made in the construction of the leveling arrangement described above without departing from the spirit of the invention. Such changes and modifications are contemplated by the inventors and therefore they do not wish to be limited except by the scope of the appended claims.

The embodiment of the invention in which an exclusive property or privilege is claimed are defined as follows:

1. A leveling arrangement for a vehicle headlamp having a reflector member provided with a reflector cavity for projecting a light beam substantially parallel to an optical axis of the reflector cavity, a retainer slot formed in an upper portion of the reflector member, said slot being defined by a bottom wall, a top wall and a pair of side walls, a spirit level member provided with a pair of outwardly extending legs located in said retainer slot, a spring clip having an end thereof fastened to said reflector member and to a first end of said spirit level member and having a portion thereof located in said slot between said top wall and said legs for continuously biasing a second end of the spirit level member towards the bottom wall, and screw means threadably received by the spirit level member at the second end thereof and adapted to engage the bottom wall whereby rotation of said screw means causes pivoted adjustment of a position of the spirit level member about said first end and thereby allows the spirit level member to be calibrated relative to the optical axis of the reflector cavity.

2. A leveling arrangement for a vehicle headlamp having a reflector member provided with a reflector cavity for projecting a light beam substantially parallel to an optical axis of the reflector cavity, a retainer slot formed in an upper portion of the reflector member, said slot being defined by a bottom wall, a top wall and a pair of side walls, a spirit level member provided with a pair of outwardly extending legs located in said retainer slot, a spring clip comprising a T-shaped section connected to a pair of laterally spaced leaf spring members, the T-shaped section being fastened to said reflector member and to a first end of said spirit level member and having the leaf spring members located in said slot between said top wall and said legs for continuously biasing a second end of the spirit level member towards the bottom wall, and screw means threadably received by the spirit level member at the second end thereof and adapted to engage the bottom wall whereby rotation of said screw means causes pivoted adjustment of a position of the spirit level member about said first end of and thereby allows the spirit level member to be calibrated relative to the optical axis of the reflector cavity.

3. A leveling arrangement for a vehicle headlamp having a reflector member provided with a reflector cavity for projecting a light beam substantially parallel to an optical axis of the reflector cavity, a T-shaped retainer slot formed in an upper portion of the reflector member, said slot being defined by a bottom wall, a top wall and a pair of side walls, a spirit level member provided with a pair of outwardly extending legs located in said retainer slot, a spring clip having a T-shaped section including a cross arm and a depending leg one of which is fastened to said reflector member, a pair of tabs formed with said cross arm and connected to a first end of the spirit level member, a pair of leaf spring members extending outwardly from the cross arm and being located in said slot between said top wall and said legs for continuously biasing a second end of the spirit level member towards the bottom wall, and screw means threadably received by the spirit level member at the second end thereof and adapted to engage the bottom wall whereby rotation of said screw means causes pivoted adjustment of a position of the spirit level member about said first end of and thereby allows the spirit level member to be calibrated relative to the optical axis of the reflector cavity.

* * * * *